(12) United States Patent
Shen et al.

(10) Patent No.: US 11,134,014 B2
(45) Date of Patent: Sep. 28, 2021

(54) LOAD BALANCING METHOD, APPARATUS, AND DEVICE

(71) Applicant: HUAWEI TECHNOLOGIES CO., LTD., Guangdong (CN)

(72) Inventors: Li Shen, Nanjing (CN); Feng Yuan, Nanjing (CN); Ling Jiang, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 58 days.

(21) Appl. No.: 16/239,353

(22) Filed: Jan. 3, 2019

(65) Prior Publication Data

US 2019/0140956 A1    May 9, 2019

Related U.S. Application Data

(63) Continuation of application No. PCT/CN2017/076987, filed on Mar. 16, 2017.

(30) Foreign Application Priority Data

Jul. 19, 2016  (CN) .......................... 201610570733.8

(51) Int. Cl.
*H04L 12/743* (2013.01)
*H04L 12/803* (2013.01)
(Continued)

(52) U.S. Cl.
CPC ............ *H04L 47/125* (2013.01); *H04L 45/02* (2013.01); *H04L 45/7453* (2013.01);
(Continued)

(58) Field of Classification Search
None
See application file for complete search history.

(56) References Cited

U.S. PATENT DOCUMENTS 9,565,114 B1 * 2/2017 Kabbani ............... H04L 47/125
10,015,096 B1 * 7/2018 Singh .................... H04L 47/125
(Continued)

FOREIGN PATENT DOCUMENTS

CN    102136986 A    7/2011
CN    102710489 A    10/2012
(Continued)

OTHER PUBLICATIONS

Mohammad Al-Fares et al, Hedera: Dynamic Flow Scheduling for Data Center Networks. Conference Paper—Jul. 2010, 16 pages.
(Continued)

*Primary Examiner* — Duc T Duong
(74) *Attorney, Agent, or Firm* — Westerman, Hattori, Daniels Adrian, LLP

(57) ABSTRACT

This application discloses a load balancing method and apparatus, and a device, and relates to the field of network technologies. The method includes: after a packet sent by a server is received, determining whether the packet is a first packet of a flowlet, if the packet is the first packet of the flowlet, determining a destination switch based on a destination address of the packet, determining a weight value of at least one equal-cost path associated with the destination switch in a stored equal-cost path weight table, where the equal-cost path weight table stores a correspondence between the at least one equal-cost path and the weight value, and scheduling, based on the weight value of the at least one equal-cost path, the packet onto a corresponding equal-cost path for transmission.

15 Claims, 10 Drawing Sheets

(51) Int. Cl.
*H04L 12/751* (2013.01)
*H04L 12/937* (2013.01)
*H04L 12/707* (2013.01)
*H04L 12/801* (2013.01)

(52) U.S. Cl.
CPC ............ *H04L 49/254* (2013.01); *H04L 45/24* (2013.01); *H04L 47/11* (2013.01)

(56) References Cited

U.S. PATENT DOCUMENTS

| | | | | |
|---|---|---|---|---|
| 2011/0063979 | A1* | 3/2011 | Matthews | H04L 45/745 370/237 |
| 2013/0286846 | A1* | 10/2013 | Atlas | H04L 47/726 370/236 |
| 2014/0092738 | A1* | 4/2014 | Grandhi | H04L 45/50 370/235 |
| 2014/0108489 | A1 | 4/2014 | Glines et al. | |
| 2014/0293786 | A1* | 10/2014 | Lin | H04L 47/17 370/235 |
| 2015/0124652 | A1 | 5/2015 | Dharmapurikar et al. | |
| 2015/0127797 | A1 | 5/2015 | Attar et al. | |
| 2015/0277990 | A1* | 10/2015 | Xiong | G06F 8/443 718/106 |
| 2016/0043933 | A1* | 2/2016 | Gopalarathnam | H04L 45/22 709/226 |
| 2017/0295100 | A1* | 10/2017 | Hira | H04L 47/125 |

FOREIGN PATENT DOCUMENTS

| | | |
|---|---|---|
| CN | 104580002 A | 4/2015 |
| CN | 105591974 A | 5/2016 |

OTHER PUBLICATIONS

Mohammad Alizadeh et al, CONGA: Distributed Congestion-Aware Load Balancing for Datacenters. SIGCOMM'14, Aug. 17-22, 2014, Chicago, IL, USA., 12 pages.

Keqiang He et al, Presto: Edge-based Load Balancing for Fast Datacenter Networks. SIGCOMM'15, Aug. 17-21, 2015, London, United Kingdom, 14 pages.

* cited by examiner

LOAD BALANCING METHOD, APPARATUS, AND DEVICE

CROSS-REFERENCE TO RELATED APPLICATIONS

This application is a continuation of International Application No. PCT/CN2017/076987, filed on Mar. 16, 2017, which claims priority to Chinese Patent Application No. 201610570733.8, filed on Jul. 19, 2016, The disclosures of the aforementioned applications are hereby incorporated by reference in their entireties.

TECHNICAL FIELD

This application relates to the field of network technologies, and in particular, to a load balancing method and apparatus, and a device.

BACKGROUND

With continuous development of network technologies, data center networks are increasingly widely created by cloud service providers and enterprises. When traffic transmission is performed based on a data center network, two types of traffic congestion are usually caused. In FIG. 1A, a conventional load balancing method, such as an equal-cost multi-path routing (ECMP) manner, can be used to implement load balancing only with respect to a quantity of flows. Therefore, as shown in FIG. 1A, a case in which a plurality of elephant flows are exactly mapped onto a same link may occur. As a result, converged traffic exceeds a port capacity, causing traffic congestion. Such congestion is referred to as local collision. In FIG. 1B, leaf switches perform respective load balancing, and there is no global information. Therefore, a case shown in FIG. 1B may occur, that is, a plurality of elephant flows that are sent by a plurality of leaf switches to a same leaf switch are sent to a same transit switch (such as a spine switch), causing downstream traffic congestion. Such congestion is referred to as downstream collision. Therefore, to avoid the foregoing two types of congestion, how to perform load balancing on network traffic is concerned by persons skilled in the art.

Referring to FIG. 2, in the prior art, load balancing is implemented based on the following main logic: A source leaf switch detects a flowlet, and sends packets in one sliding window together as one flowlet. The source leaf switch always selects a least-load path for sending each new flowlet. A load status of a path is obtained by performing the following operations: (1) The source leaf switch encapsulates congestion information fields (including LBTag and CE) into an overlay header of each packet. LBTag represents a port number of the source leaf switch, and CE represents a path congestion metric. The CE is updated when the packet passes through a spine switch, and the updated field CE is temporarily stored in a congestion-from-leaf table after the packet arrives at a destination leaf switch. (2) After receiving the packet, the destination leaf switch sends a reverse packet to the source leaf switch. In one embodiment, the destination leaf switch encapsulates congestion information fields (including FB_LBTag and FB_Metric) into an overlay header of the reverse packet. FB_LBTag represents a port number of the destination leaf switch, and FB_Metric represents a congestion metric. After receiving the reverse packet, the source leaf switch stores the reverse packet in a congestion-to-leaf table. In this way, the source leaf switch may perform traversing, based on a congestion status of a local uplink and a congestion status of a downlink that is fed back, to obtain an outport corresponding to a least-load path, so as to determine an optimum path for the flowlet.

The destination leaf switch needs to return all downlink load information to the source leaf switch, and needs to perform traversing to obtain the outport corresponding to the least-load path. Therefore, such a load balancing method is quite complicated and a load balancing effect is unsatisfactory.

SUMMARY

To resolve the prior-art problem, embodiments of this application provide a load balancing method and apparatus, and a device. The technical solutions are as follows:

In one embodiment, a controller first calculates a weight value of each equal-cost path based on a network topology, a port status, a link bandwidth, and other information. Specifically, for a source switch, the controller calculates weight values of multiple equal-cost paths between the source switch and destination switches, to obtain an equal-cost path weight table of the source switch, where the equal-cost path weight table stores a correspondence between the multiple equal-cost paths and the weight values, and delivers the equal-cost path weight table to the source switch. In this way, each source switch stores an equal-cost path weight table matching the source switch.

In one implementation, the controller usually calculates the weight values of the multiple equal-cost paths between the source switch and the destination switches in the following manner: for a destination switch, determining each equal-cost path between the source switch and the destination switch, where the equal-cost path includes a first link path from the source switch to a transit switch, and a second link path from the transit switch to the destination switch, and for an equal-cost path, calculating a weight value of the equal-cost path based on link statuses of the first link path and the second link path.

In another embodiment, after receiving a packet sent by a server, the source switch first detects a flowlet, and determines whether the packet is a first packet of the flowlet. The determining whether the packet is a first packet of a flowlet may be implemented in the following manner:

performing hash calculation based on 5-tuple information of the packet to obtain a hash value, determining a flowlet entry matching the hash value in a stored flowlet table, and if valid bit information in the flowlet entry is a first value, determining that the packet is the first packet of the flowlet, or if valid bit information in the flowlet entry is a second value, determining that the packet is a non-first packet of the flowlet, where a flowlet entry includes at least 5-tuple information, last active information, outport information, and valid bit information of a flowlet.

If the packet is the first packet of the flowlet, the source switch determines a destination switch based on a destination address of the packet, determines a weight value of at least one equal-cost path associated with the destination switch in the stored equal-cost path weight table, and schedules, based on the weight value of the at least one equal-cost path, the packet onto a corresponding equal-cost path for transmission.

In the embodiments of this application, the scheduling, based on the weight value of the at least one equal-cost path, the packet onto a corresponding equal-cost path for transmission includes:

obtaining a weight value of each of the at least one equal-cost path, calculating a sum of weight values of all the equal-cost paths, and generating a random number in a value range from zero to the sum of the weight values, determining, from the at least one equal-cost path based on a value of the random number, a first designated equal-cost path matching the random number, and scheduling the packet onto the first designated equal-cost path for transmission.

It should be noted that, after determining the first designated equal-cost path matching the random number, the source switch further stores a path identifier of the first designated equal-cost path as the outport information, into the flowlet entry corresponding to the flowlet table. In addition, the source switch further updates the 5-tuple information and last active time in the flowlet entry, where the last active time is updated as current time, and updates the valid bit information from the first value to the second value.

When the packet is the non-first packet of the flowlet, the source switch determines a second designated equal-cost path based on the outport information in the flowlet entry, schedules the packet onto the second designated equal-cost path for transmission, and updates last active time in the flowlet entry as current time.

In another embodiment, if a link status of the at least one equal-cost path associated with the destination switch changes, the source switch sends a link status change message to the controller, where the link status change message indicates a third designated equal-cost path whose link status changes, so that the controller recalculates weight values of multiple equal-cost paths between each source switch and each destination switch based on the link status change message, to obtain a new equal-cost path weight table, and sends the new matched equal-cost path weight table to the source switch. In this way, after receiving the new equal-cost path weight table sent by the controller, each source switch stores the new equal-cost path weight table to replace the previously stored equal-cost path weight table.

In another embodiment, for each flowlet entry in the flowlet table stored in the source switch, the source switch periodically calculates a difference between the current time and recorded last active time; and if the difference is greater than a preset time threshold, the source switch sets the flowlet entry to an invalid state, to facilitate flowlet detection.

The technical solutions provided in the embodiments of this application have the following benefits:

The switch detects the flowlet after receiving the packet sent by the server, and then the switch directly performs flowlet-based load balancing based on the locally stored equal-cost path weight table. The equal-cost path weight table stores the correspondence between the at least one equal-cost path and the weight value. For example, after detecting that the currently received packet is the first packet of the flowlet, the switch directly determines the destination switch based on the destination address of the packet, determines the weight value of the at least one equal-cost path associated with the destination switch in the stored equal-cost path weight table, and further schedules, based on the weight value of the at least one equal-cost path, the packet onto the corresponding equal-cost path for transmission, thereby implementing load balancing without obtaining load statuses of all paths in real time. This greatly reduces complexity of a load balancing algorithm, and achieves a relatively great effect.

DESCRIPTION OF EMBODIMENTS

To make the objectives, technical solutions, and advantages of this application clearer, the following further describes the example implementations of this application in detail with reference to the accompanying drawings.

Before the embodiments of this application are described in detail, a flowlet principle is described first.

Figure 1A:
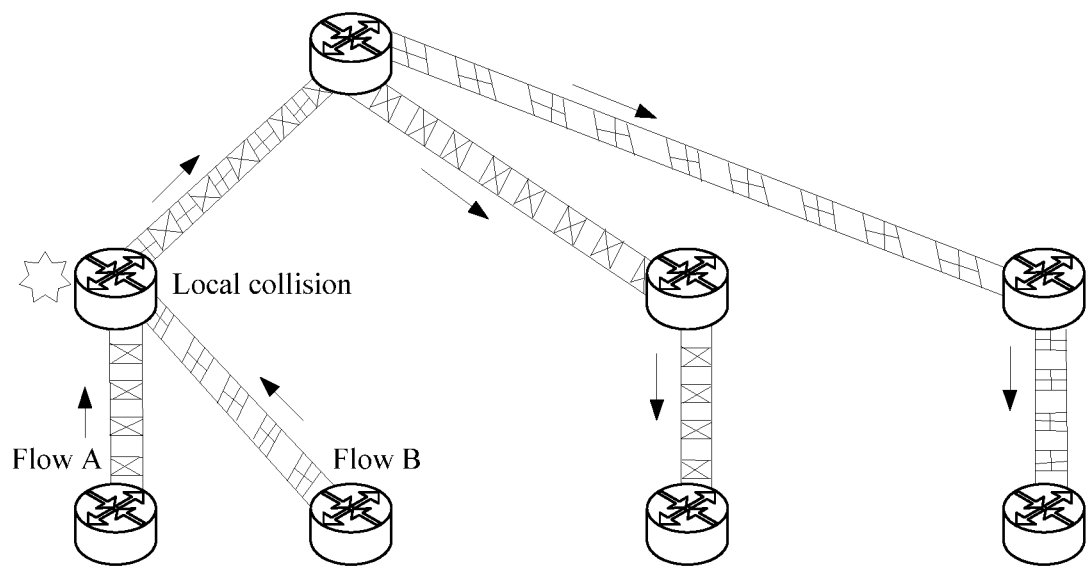
FIG. 1A is a logical schematic diagram of a load balancing method according to background of this application.
Figure 1B:
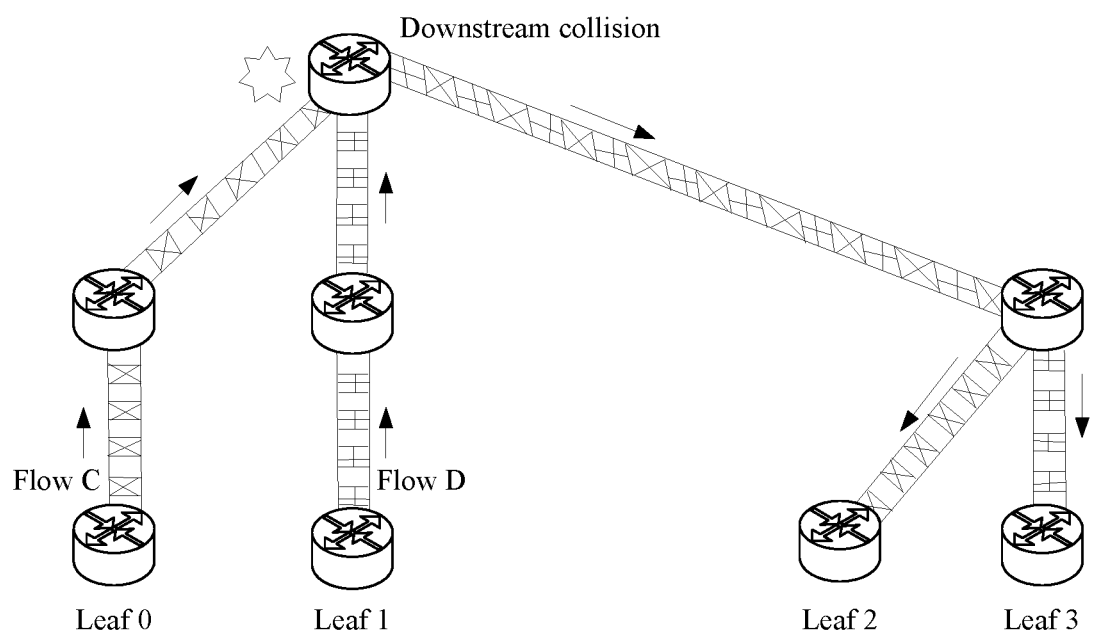
FIG. 1B is a logical schematic diagram of a load balancing method according to background of this application.
Figure 2:
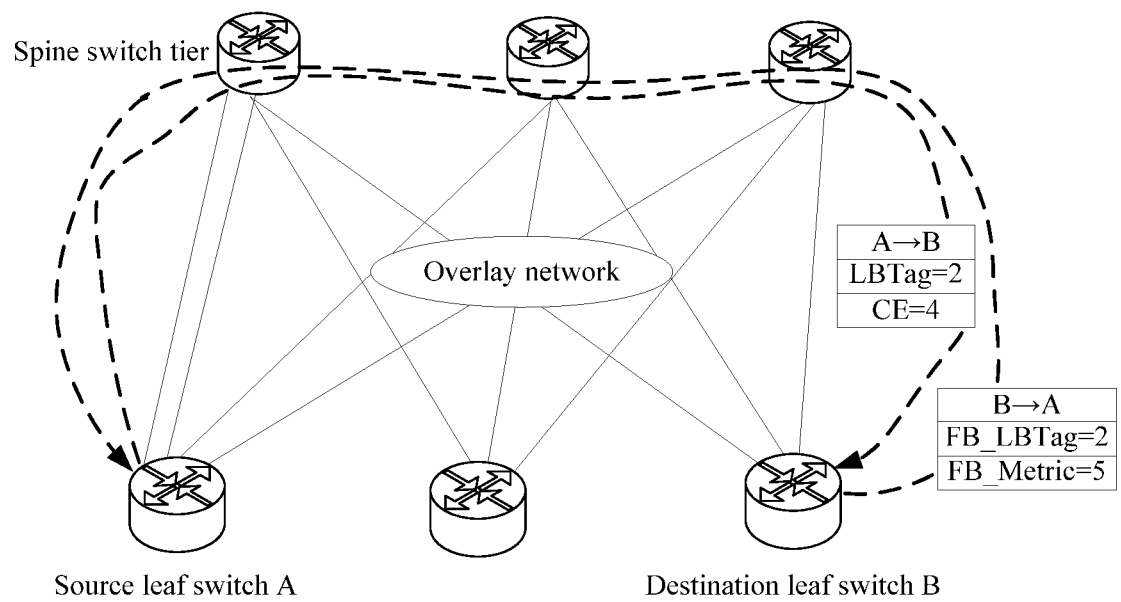
FIG. 2 is a logical schematic diagram of a load balancing method according to background of this application.
Figure 3:
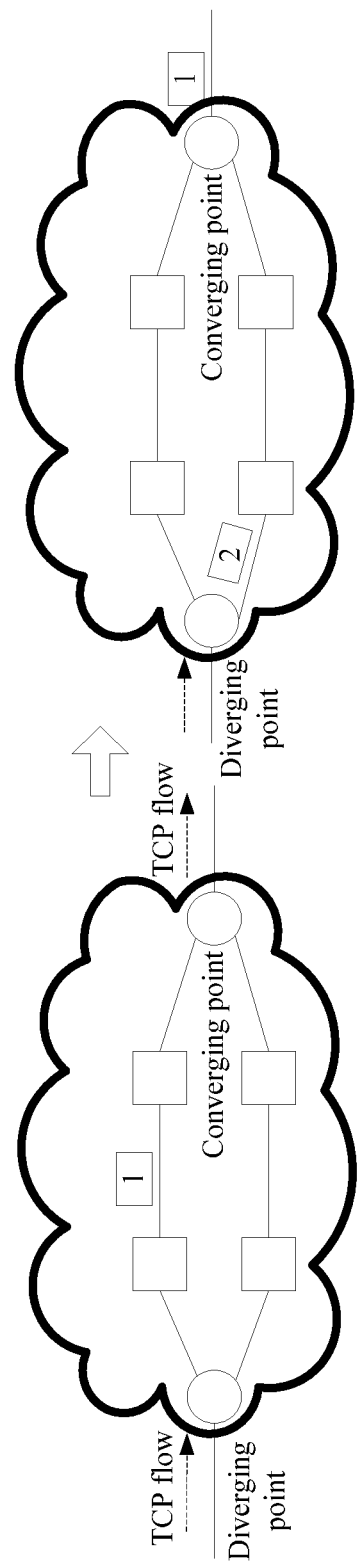
FIG. 3 is a logical schematic diagram of a flow transmission process according to an embodiment of this application.

As shown in FIG. 3, when a Transmission Control Protocol (TCP) flow is transmitted, if it is ensured that a transmission time interval between adjacent packets is greater than a delay difference between two paths, the two packets can be sent by using different paths, without causing disorder. Specifically, at a diverging point, a packet 1 is transmitted by using an upper path, and after a delay difference between two paths, a packet 2 is transmitted by using a lower path. In this way, it can be ensured that the packet 2 arrives at a converging point after the packet 1 arrives at the converging point, without causing the packets to be in disorder. A TCP flow has an inherent characteristic of burst. To be specific, for the TCP flow, all packets in a sliding window are sent together as a burst, and an acknowledgement (ACK) is awaited. After the ACK is received, a packet in a next window is sent. In this way, there is naturally a relatively long time interval between two bursts. The time interval can ensure that the two bursts are transmitted by using different paths, and no disorder occurs at the converging point. Such a burst is referred to as a flowlet.

It should be noted that, a flowlet does not necessarily include a plurality of packets in one sliding window, but may include packets in a plurality of sliding windows, or even packets in one sliding window may be divided into several flowlets. This depends on a transmission time interval used for determining the flowlet. A shorter transmission time interval indicates that an original flow is divided into more flowlets, and a longer transmission time interval indicates that an original flow is divided into fewer flowlets. The transmission time interval should neither be excessively long nor excessively short, but has a critical value, to ensure that an adequate quantity of flowlets are obtained, without causing disorder when the flowlets are sent to the converging point by using different paths.

Figure 4:
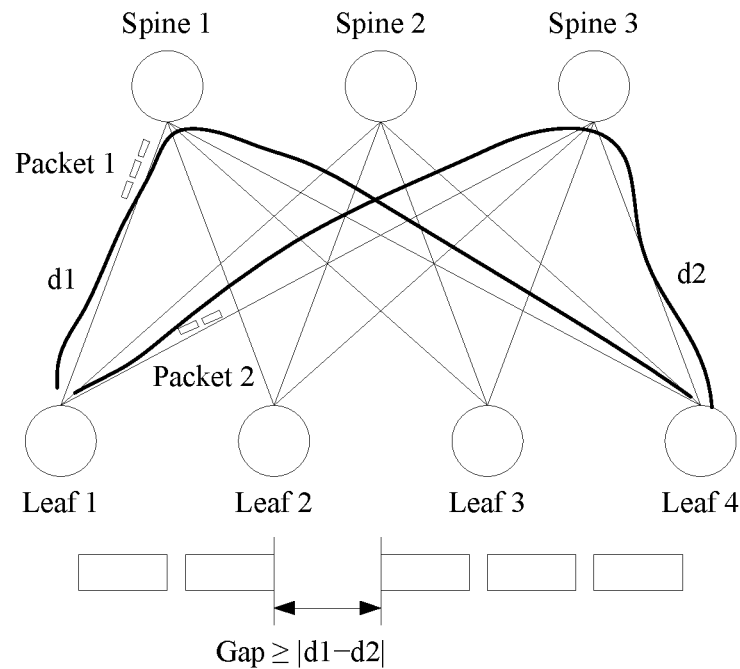
FIG. 4 is a logical schematic diagram of flowlet transmission in a data center network of a leaf-spine architecture according to an embodiment of this application.

FIG. 4 shows a basic principle of a flowlet in a data center network of a leaf-spine architecture. For example, a first leaf switch is identified by using a leaf 1, and a fourth leaf switch is identified by using a leaf 4. In FIG. 4, a packet 1 and a packet 2 are respectively sent from the leaf 1 to the leaf 4 by using two paths indicated by bold lines in the diagram. Delays of the two paths are identified by using d1 and d2 respectively. A sending time interval between the packet 1 and the packet 2 needs to be ensured to meet the following: Gap≥|d1-d2|, so that the packet 1 arrives at the leaf 4 earlier than the packet 2, ensuring that no disorder is caused between the two packets.

Figure 5:
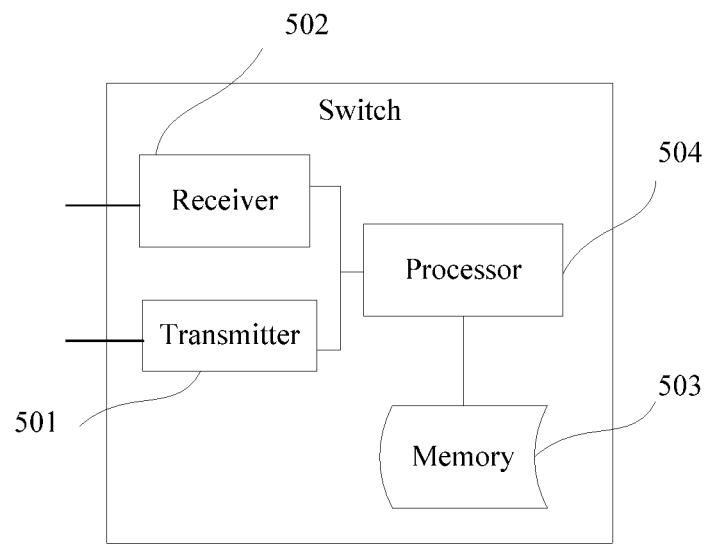
FIG. 5 is a schematic structural diagram of a switch according to an embodiment of this application.

FIG. 5 is a schematic structural diagram of a switch according to an embodiment of this application. Referring to FIG. 5, the switch includes a transmitter 501, a receiver 502, a memory 503, and a processor 504. The memory 503, the transmitter 501, and the receiver 502 are all connected to the processor 504. The memory 503 stores program code, and the processor 504 is configured to invoke the program code to perform the following operations:

after a packet sent by a server is received by the receiver 502, determining whether the packet is a first packet of a flowlet, if the packet is the first packet of the flowlet, determining a destination switch based on a destination address of the packet, determining a weight value of at least one equal-cost path associated with the destination switch in a stored equal-cost path weight table, where the equal-cost path weight table stores a correspondence between the at least one equal-cost path and the weight value, and scheduling, based on the weight value of the at least one equal-cost path, the packet onto a corresponding equal-cost path for transmission.

In another embodiment, the processor 504 is configured to invoke the program code to perform the following operations:

obtaining a weight value of each of the at least one equal-cost path, calculating a sum of weight values of all the equal-cost paths, and generating a random number in a value range from zero to the sum of the weight values; determining, from the at least one equal-cost path based on a value of the random number, a first designated equal-cost path matching the random number, and scheduling the packet onto the first designated equal-cost path for transmission.

In another embodiment, the processor 504 is configured to invoke the program code to perform the following operations:

performing hash calculation based on 5-tuple information of the packet to obtain a hash value, determining a flowlet entry matching the hash value in a stored flowlet table; and if valid bit information in the flowlet entry is a first value, determining that the packet is the first packet of the flowlet, updating the 5-tuple information and last active time in the flowlet entry, where the last active time is updated as current time, and updating the valid bit information from the first value to a second value, where a flowlet entry includes at least 5-tuple information, last active information, outport information, and valid bit information of a flowlet.

In another embodiment, the processor 504 is configured to invoke the program code to perform the following operations:

if the valid bit information in the flowlet entry is the second value, determining that the packet is a non-first packet of the flowlet, and determining a second designated equal-cost path based on the outport information in the flowlet entry; and scheduling the packet onto the second designated equal-cost path for transmission, and updating the last active time in the flowlet entry as the current time.

In another embodiment, the processor 504 is configured to invoke the program code to perform the following operations:

after determining the first designated equal-cost path matching the random number, storing a path identifier of the first designated equal-cost path as outport information, into a flowlet entry corresponding to the flowlet table.

In another embodiment, the processor 504 is configured to invoke the program code to perform the following operations:

if a link status of the at least one equal-cost path changes, sending a link status change message to a controller by using the transmitter 501, where the link status change message indicates a third designated equal-cost path whose link status changes, so that the controller recalculates the weight value of the at least one equal-cost path based on the link status change message, to obtain a new equal-cost path weight table, and receiving, by using the receiver 502, the new equal-cost path weight table sent by the controller, and storing the new equal-cost path weight table.

In another embodiment, the processor 504 is configured to invoke the program code to perform the following operations:

for each flowlet entry in the flowlet table, periodically calculating a difference between current time and last active time, and if the difference is greater than a preset time threshold, setting the flowlet entry to an invalid state.

After the switch provided in this embodiment of this application receives and stores the equal-cost path weight table delivered by the controller, if the switch receives the packet sent by the server, the switch detects the flowlet, and directly performs flowlet-based load balancing based on the locally stored equal-cost path weight table and the locally stored flowlet table, to select an equal-cost path for transmitting the currently received packet. The switch needs to recalculate a weight value of the equal-cost path only when a link status changes, instead of obtaining load statuses of all paths in real time. This greatly reduces complexity of a load balancing algorithm, and achieves a relatively great effect.

Figure 6:
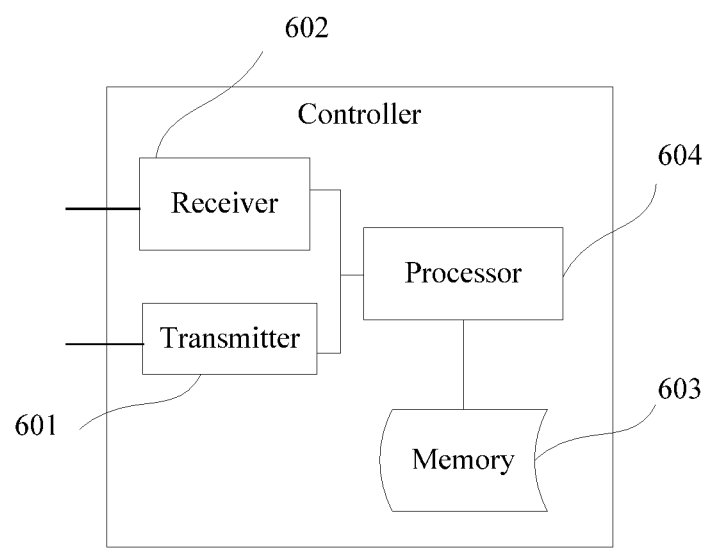
FIG. 6 is a schematic structural diagram of a controller according to an embodiment of this application.

FIG. 6 is a schematic structural diagram of a controller according to an embodiment of this application. Referring to FIG. 6, the controller includes a transmitter 601, a receiver 602, a memory 603, and a processor 604. The memory 603, the transmitter 601, and the receiver 602 are all connected to the processor 604. The memory 603 stores program code, and the processor 604 is configured to invoke the program code to perform the following operations:

for a source switch, calculating weight values of multiple equal-cost paths between the source switch and destination switches, to obtain an equal-cost path weight table of the source switch, and delivering the equal-cost path weight table to the source switch by using the transmitter 601, so that after receiving a packet sent by a server and determining that the packet is a first packet of a flowlet, the source switch determines a destination switch based on a destination address of the packet, determines a weight value of at least one equal-cost path associated with the destination switch in the equal-cost path weight table, and schedules, based on the weight value of the at least one equal-cost path, the packet onto a corresponding equal-cost path for transmission.

In another embodiment, the processor 604 is configured to invoke the program code to perform the following operations:

for a destination switch, determining each equal-cost path between the source switch and the destination switch, where the equal-cost path includes a first link path from the source switch to a transit switch, and a second link path from the transit switch to the destination switch, and for an equal-cost path, calculating a weight value of the equal-cost path based on link statuses of the first link path and the second link path.

In another embodiment, the processor 604 is configured to invoke the program code to perform the following operations:

receiving, by using the receiver 602, a link status change message sent by the source switch, where the link status change message indicates an equal-cost path whose link status changes, recalculating weight values of multiple equal-cost paths between each source switch and each destination switch based on the link status change message, to obtain a new equal-cost path weight table, and sending the new matched equal-cost path weight table to the source switch by using the transmitter 601.

After the controller provided in this embodiment of this application sets a weight value for each equal-cost path between every two switches based on overall network link information, and delivers a corresponding equal-cost path weight table to each switch, if the switch receives the packet sent by the server, the switch detects the flowlet, and directly performs flowlet-based load balancing based on the locally stored equal-cost path weight table and the locally stored flowlet table, to select an equal-cost path for transmitting the currently received packet. The switch needs to recalculate a weight value of the equal-cost path only when a link status changes, instead of obtaining load statuses of all paths in real time. This greatly reduces complexity of a load balancing algorithm, and achieves a relatively great effect.

Figure 7:
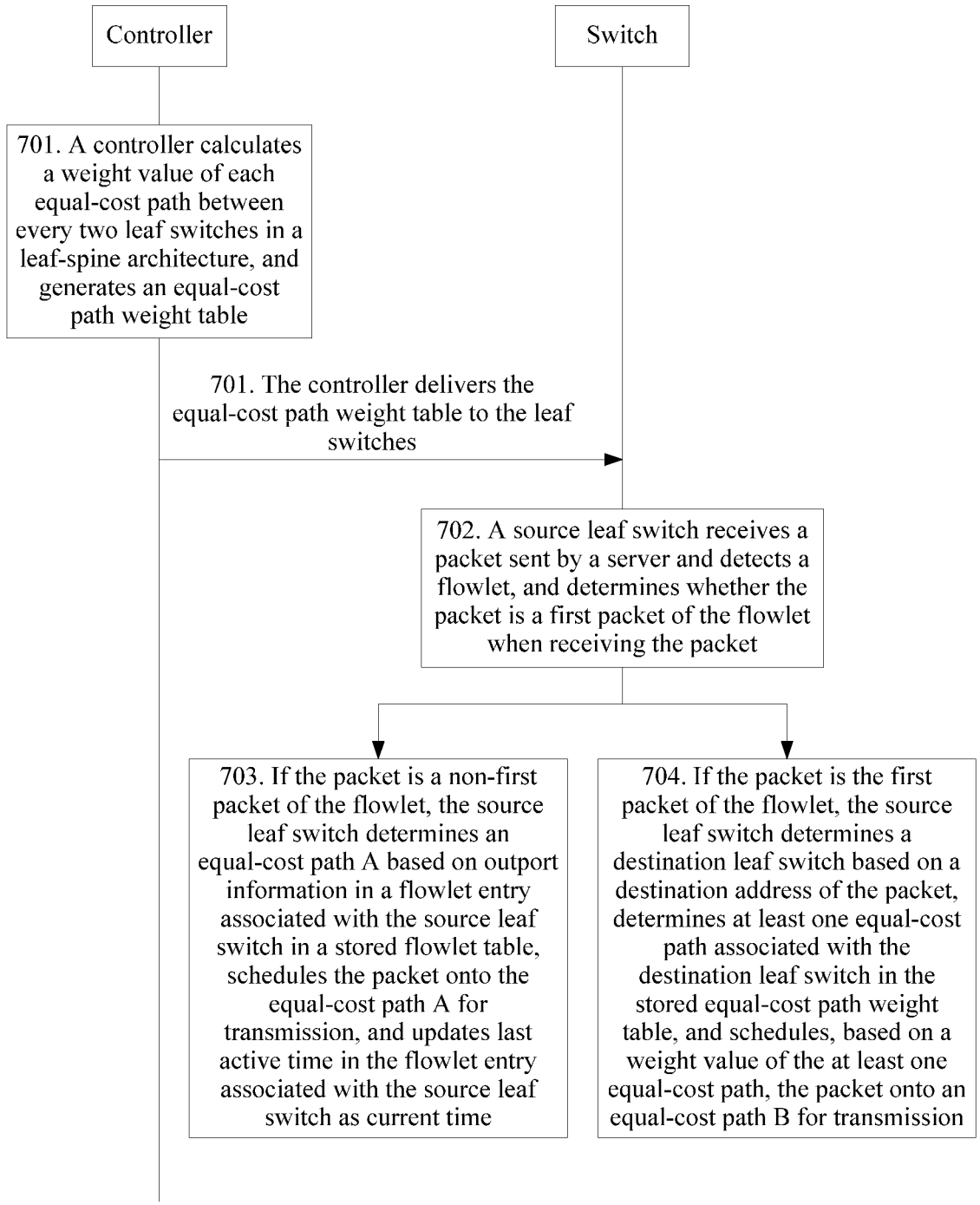
FIG. 7 is a flowchart of a load balancing method according to an embodiment of this application.

FIG. 7 is a flowchart of a load balancing method according to an embodiment of this application. In this embodiment of this application, there are mainly two concepts: one is to divide an elephant flow into flowlets, and the other is to perform flowlet-based load balancing by using a weighted cost multipath (WCMP) method. A data center network of a two-stage Clos leaf-spine architecture is used as an example. Referring to FIG. 7, a procedure of the method provided in this embodiment of this application includes the following operations.

Operation 701. A controller calculates a weight value of each equal-cost path between every two leaf switches in the leaf-spine architecture, generates an equal-cost path weight table, and delivers the equal-cost path weight table to the leaf switches.

Figure 8:
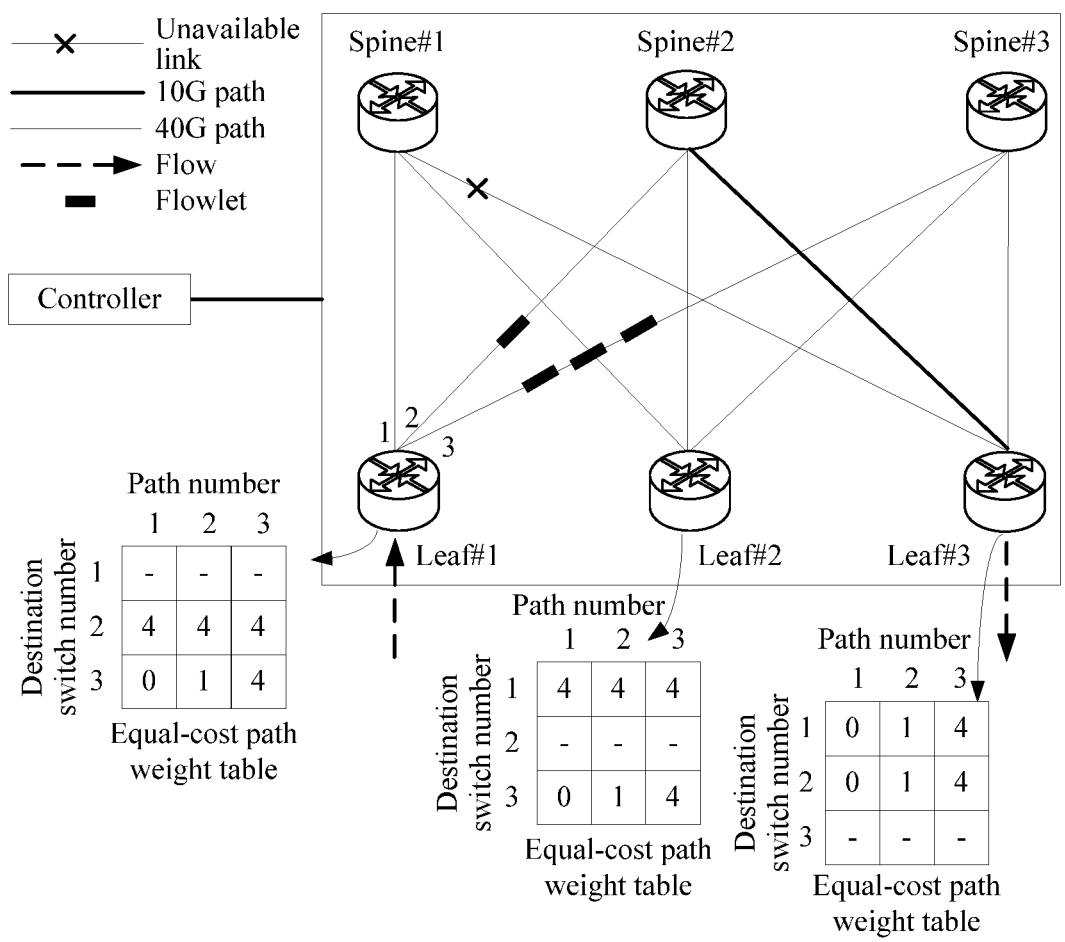
FIG. 8 is a schematic system diagram of a load balancing method according to an embodiment of this application.

As shown in FIG. 8, the controller calculates the weight value of each equal-cost path between every two leaf switches based on a network topology, a port status, a link bandwidth, or the like. It should be noted that, calculating each equal-cost path between every two leaf switches means calculating, for a source leaf switch, all equal-cost paths between the source leaf switch and all destination leaf switches. In FIG. 8, equal-cost paths between every two leaf switches include three equal-cost paths between a Leaf#1 and a Leaf#2, three equal-cost paths between the Leaf#1 and a Leaf#3, three equal-cost paths between the Leaf#2 and the Leaf#1, three equal-cost paths between the Leaf#2 and the Leaf#3, three equal-cost paths between the Leaf#3 and the Leaf#1, and three equal-cost paths between the Leaf#3 and Leaf#2.

For example, the source leaf switch is the Leaf#1, and the destination leaf switch is the Leaf#2. Referring to FIG. 8, there are a total of three equal-cost paths between the Leaf#1 and the Leaf#2, that is, Leaf#1→Spine#1→Leaf#2, Leaf#1→Spine#2→Leaf#2, and Leaf#1→Spine#3→Leaf#2. For the first equal-cost path Leaf#1→Spine#1→Leaf#2, both a link Leaf#1→Spine#1 and a link Spine#1→Leaf#2 have a link bandwidth of 40G and therefore a weight value of the equal-cost path is set to 4. For the second equal-cost path Leaf#1→Spine#2→Leaf#2, both a link Leaf#1→Spine#2 and a link Spine#2→Leaf#2 have a link bandwidth of 40G and therefore a weight value of the equal-cost path is also set to 4. For the third equal-cost path Leaf#1→Spine#3→Leaf#3, both a link Leaf#1→Spine#3 and a link Spine#3→Leaf#2 have a link bandwidth of 40G, and therefore a weight value of the equal-cost path is also set to 4.

For example, the source leaf switch is the Leaf#1, and the destination leaf switch is the Leaf#3. Referring to FIG. 8, there are a total of three equal-cost paths between the Leaf#1 and the Leaf#3, that is, Leaf#1→Spine#1→Leaf#3, Leaf#1→Spine#2→Leaf#3, and Leaf#1→Spine#3→Leaf#3. For the first equal-cost path Leaf#1→Spine#1→Leaf#3, a link Spine#1→Leaf#3 is in an unavailable state, and therefore the link is down, and a weight value of the equal-cost path is set to 0. For the second equal-cost path Leaf#1→Spine#2→Leaf#3, a link Spine#2→Leaf#3 has a link bandwidth of 10G and therefore a weight value of the equal-cost path is set to 1. For the third equal-cost path Leaf#1→Spine#3→Leaf#3, both a link Leaf#1→Spine#3 and a link Spine#3→Leaf#3 have a link bandwidth of 40G, and therefore a weight value of the equal-cost path is set to 4.

For the Leaf#1, after weight values of the three equal-cost paths between the Leaf#1 and the Leaf#2, and weight values of the three equal-cost paths between the Leaf#1 and Leaf#3 are calculated, an equal-cost path weight table associated with the Leaf#1 shown in FIG. 8 may be obtained, where a horizontal axis represents a path number, and a vertical axis represents a destination leaf switch number. For the Leaf#2 and the Leaf#3, weight values of equal-cost paths may also be calculated in the foregoing manner, and an equal-cost path weight table associated with the Leaf#2 and an equal-cost path weight table associated with the Leaf#3 that are shown in FIG. 8 are obtained. After obtaining the equal-cost path weight tables, the controller sends the equal-cost path weight table associated with the Leaf#1 to the leaf switch Leaf#1, sends the equal-cost path weight table associated with the Leaf#2 to the leaf switch Leaf#2, and sends the equal-cost path weight table associated with the Leaf#3 to the leaf switch Leaf#3.

Operation 702. A source leaf switch receives a packet sent by a server and detects a flowlet, and determines whether the packet is a first packet of the flowlet when receiving the packet; and if the packet is a non-first packet of the flowlet, performs the following operation 703, or if the packet is a first packet of the flowlet, performs the following operation 704.

In this embodiment of this application, an elephant flow is scattered by using a flowlet. The source switch detects the flowlet in different implementations. One implementation is to maintain a flow table for each flow. After a packet is received, a time difference between arrival time of the current packet and arrival time of a preceding packet is calculated. If the time difference exceeds a preset time threshold for determining a flowlet, a currently received flowlet is a new flowlet. The other implementation is to maintain a flowlet table by using a flowlet entry expiration mechanism. To be specific, if an inactive time of a flowlet entry exceeds a preset time threshold, after a next packet arrives, it is determined that a valid bit of the corresponding flowlet is 0, indicating that the received packet is a first packet of a new flowlet. For more detailed descriptions, refer to the following descriptions. In this embodiment of this application, the second implementation is actually used. An advantage of using the second implementation is that a quantity of entries that need to be maintained is far fewer than that by using the first implementation.

Each time when receiving a packet, the source leaf switch performs hash calculation based on 5-tuple information of the packet, and determines a flowlet entry matching an obtained hash value in a stored flowlet table. If the hash value obtained by performing hash calculation based on the 5-tuple information of the packet is the same as a calculation result of a hash value calculated based on 5-tuple information of any flowlet entry in the flowlet table, the flowlet entry is determined as the flowlet entry matching the obtained hash value.

If valid bit information in the flowlet entry is a first value, it is determined that the packet is a first packet of the flowlet; if valid bit information in the flowlet entry is a second value, it is determined that the packet is a non-first packet of the packet. The first value is usually 0, and the second value is usually 1. The 5-tuple information usually includes: a source Internet Protocol (Src IP), a destination IP address (Dst IP), a source port (Src Port), a destination port (Dst Port), and a control protocol. In addition, content included in the flowlet table is specifically listed in the following Table 1.

TABLE 1

| Src IP | Dst IP | Src Port | Dst Port | Protocol | Last Active Time | Outport | Valid Bit |
|---|---|---|---|---|---|---|---|
| 192.168.2.100 | 192.168.3.30 | 5678 | 21 | 6 | 0x01a4f5ae | 3 | 1 |
| 10.1.10.2 | 10.2.20.1 | 8957 | 21 | 6 | 0xfd16783a | 2 | 1 |
| 192.168.2.100 | 10.3.50.1 | 2345 | 80 | 6 | 0x0a253641 | 1 | 1 |
| 200.1.2.3 | 100.2.3.4 | 2567 | 47 | 17 | 0xed16d8ea | 1 | 0 |

In Table 1, one flowlet corresponds to one entry. For a flowlet entry, first five columns elements are the 5-tuple information, last active time is used to record time for using a flowlet entry last time, and outport information is used to transmit equal-cost path information of a packet. A value of the valid bit is 0 or 1, and is used to indicate whether a flowlet recorded in a current flowlet entry is in a valid state. If the value of the valid bit information is 0, it indicates that the flowlet recorded in the current flowlet entry is in an invalid state and the flowlet expires.

Operation 703. If the packet is a non-first packet of the flowlet, the source leaf switch determines an equal-cost path A based on outport information in a flowlet entry associated with the source leaf switch in a stored flowlet table, schedules the packet onto the equal-cost path A for transmission, and updates last active time in the flowlet entry associated with the source leaf switch as current time.

In this case, when receiving the first packet of the flowlet, the source leaf switch has already established a flowlet entry associated with the source leaf switch in the flowlet table. Therefore, when receiving the non-first packet of the flowlet, the flowlet entry already includes at least the 5-tuple information, the last active time, the outport information, and the valid bit information, and the value of the valid bit information is 1. The flowlet entry includes the outport information, and therefore the source leaf switch directly determines the equal-cost path A indicated by the outport information as an equal-cost path for transmitting the packet, schedules the packet onto the equal-cost path A for transmission, and updates the last active time in the flowlet entry as the current time.

Operation 704. If the packet is the first packet of the flowlet, the source leaf switch determines a destination leaf switch based on a destination address of the packet, determines at least one equal-cost path associated with the destination leaf switch in the stored equal-cost path weight table, and schedules, based on a weight value of the at least one equal-cost path, the packet onto an equal-cost path B for transmission.

The packet is the first packet of the flowlet, and therefore the flowlet is a new flowlet. All information in the flowlet table except the valid bit information (a value being 0) is related information of a preceding timed-out flowlet. Therefore, the source leaf switch further needs to store 5-tuple information of the packet and last active time for a corresponding flowlet entry in the flowlet table, where the last active time is stored as current time, and update the valid bit information from the first value to the second value, that is, update the valid bit information from 0 to 1. Then, the source leaf switch further performs calculation, based on the equal-cost path weight table delivered by the controller, to schedule the packet onto a specific equal-cost path for transmission. A specific process of determining the equal-cost path B is as follows.

The source leaf switch obtains a weight value of each equal-cost path between the source leaf switch and the destination leaf switch, calculates a sum of weight values of all the equal-cost paths, and generates a random number in a value range from zero to the sum of the weight values, and determines, based on a value of the random number, the equal-cost path B matching the random number of all the equal-cost paths between the source leaf switch and the destination leaf switch, and schedules the packet onto the equal-cost path B for transmission.

For example, the packet is sent from the Leaf#1 to the Leaf#3. It can be seen from FIG. 8 that, the weight values of the three equal-cost paths from the Leaf#1 to the Leaf#3 are 0, 1, and 4, respectively. Therefore, the sum of the weight values of the equal-cost paths is 5.

For each new flowlet (or a first packet of the flowlet), a random number ranging from 1 to 5 is generated. If the value of the random number is 1, the packet is scheduled onto the equal-cost path Leaf#1→Spine#2→Leaf#3 (that is, from a second outport of the Leaf#1 in FIG. 8). If the random number ranges from 2 to 5, the packet is scheduled onto the equal-cost path Leaf#1→Spine#3→Leaf#3 (that is, from a third outport of the Leaf#1 in FIG. 8), This can ensure that a ratio of quantities of flowlets on the three equal-cost paths from the Leaf#1 to Leaf#3 is 0:1:4, thereby implementing load balancing.

It should be noted that, after the equal-cost path B is determined, a path identifier of the equal-cost path B is stored as the outport information, into a corresponding flowlet entry in the flowlet table. In this way, for a following packet of the flowlet (that is, a non-first packet of the flowlet), the outport information in the flowlet entry may be directly read for sending the packet.

Figures 9, 10:
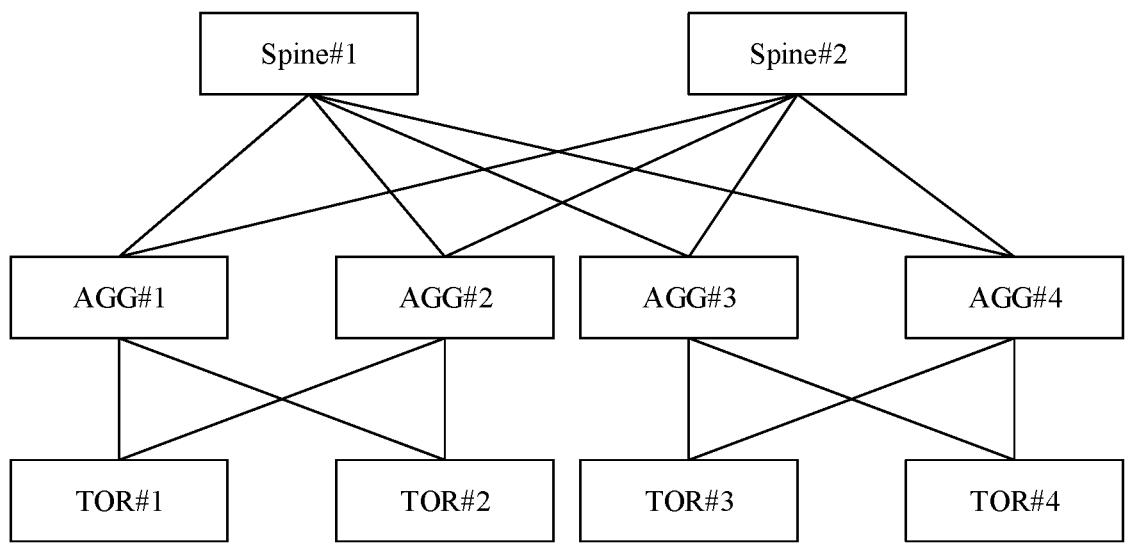
FIG. 9 is a schematic diagram of an equal-cost path weight table according to an embodiment of this application.
FIG. 10 is a schematic diagram of a data center network of a three-stage Clos architecture according to an embodiment of this application.

In addition, when a link status of each equal-cost path between every two leaf switches changes, for example, when a port is down or up, an associated leaf switch reports the case that the port is down or up to the controller, and the controller recalculates, based on the case that the port is down or up, the weight value of each equal-cost path between every two leaf switches in a manner similar to operation 701, and delivers a changed weight value to a related leaf switch. Assuming that a link Spine#1→Leaf#3 in FIG. 8 recovers, the equal-cost path weight tables of the leaf switches change, as shown in FIG. 9. Compared with FIG. 8, it can be seen that, after the link Spine#1→Leaf#3 recovers, a change occurs in the equal-cost path weight table associated with the Leaf#1, the equal-cost path weight table associated with the Leaf#2, and the equal-cost path weight table associated with the Leaf#3. Therefore, new equal-cost path weight tables are sent to the three leaf switches respectively.

It should be noted that, the leaf switch periodically scans all flowlet entries in the flowlet table, and sets an expired flowlet entry to an invalid state. The expired flowlet entry is an entry in which a difference obtained by subtracting last active time in the entry from current time is greater than a preset time threshold. To be specific, for each flowlet entry in the flowlet table, the leaf switch periodically calculates a difference between current time and last active time recorded in the flowlet entry; and if the difference is greater than the preset time threshold, sets the flowlet entry to the invalid state.

In addition, the load balancing method described in this embodiment of this application can also be applied to a data center network of a three-stage Clos fat-tree architecture. The three-stage Clos fat-tree architecture is actually obtained by overlaying a plurality of two-stage Closes. In the three-stage Clos fat-tree architecture shown in FIG. 10, each of two pools of devices (POD) is corresponding to a two-stage Clos. To be specific, a top of rack (TOR)#1, a TOR#2, an aggregation switch (AGG)#1, and an AGG#2 form a two-stage Clos; and a TOR#3, a TOR#4, an AGG#3, and an AGG#4 form another two-stage Clos. In addition, the AGG#1, the AGG#2, the AGG#3, and the AGG#4 in a second layer along with a Spine#1 and a Spine#2 also form a two-stage Clos. The Clos architectures are used to implement the solution described in this application, and a quite great effect of load balancing can be achieved.

According to the method provided in this embodiment of this application, the controller sets a weight value for each equal-cost path between every two switches based on overall network link information, and delivers the corresponding equal-cost path weight table to each switch. After the switch receives the packet sent by the server, the switch detects the flowlet, and may directly perform flowlet-based load balancing based on the locally stored equal-cost path weight table and the locally stored flowlet table. The switch needs to recalculate a weight value of the equal-cost path only when a link status changes, instead of obtaining load statuses of all paths in real time. This greatly reduces complexity of a load balancing algorithm, and achieves a relatively great effect.

Figure 11:
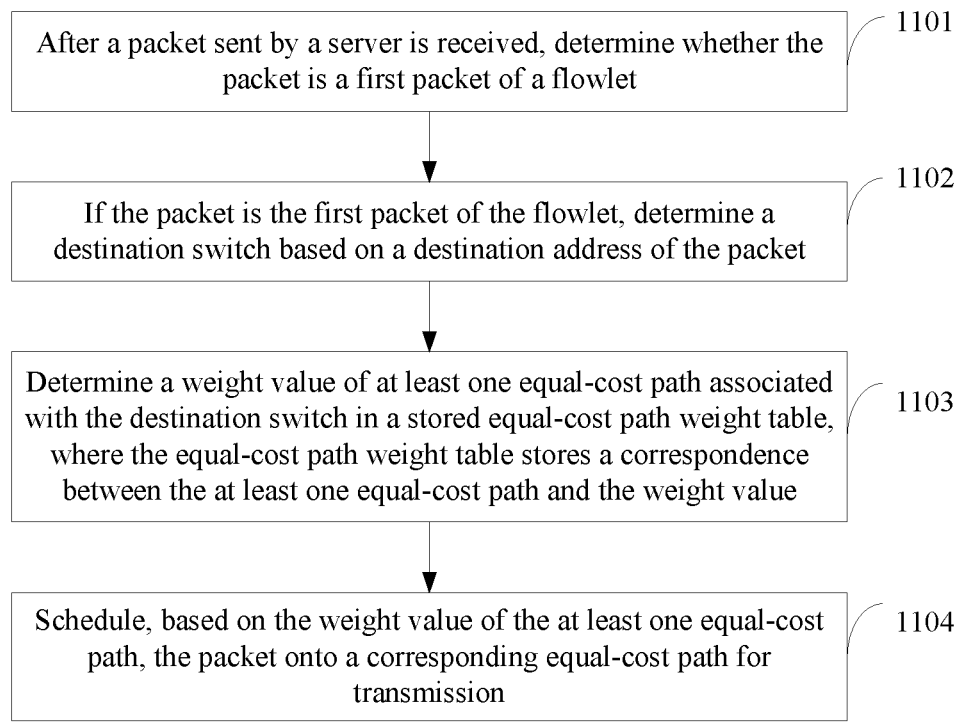
FIG. 11 is a flowchart of a load balancing method according to an embodiment of this application.

FIG. 11 is a flowchart of a load balancing method according to an embodiment of this application. For example, from a perspective of executing the method by a switch, referring to FIG. 11, the procedure of the method provided in this embodiment of this application includes the following operations.

Operation 1101. After a packet sent by a server is received, determine whether the packet is a first packet of a flowlet; and if the packet is the first packet of the flowlet, perform the following operation 1102.

Operation 1102. If the packet is the first packet of the flowlet, determine a destination switch based on a destination address of the packet.

Operation 1103. Determine a weight value of at least one equal-cost path associated with the destination switch in a stored equal-cost path weight table, where the equal-cost path weight table stores a correspondence between the at least one equal-cost path and the weight value.

Operation 1104. Schedule, based on the weight value of the at least one equal-cost path, the packet onto a corresponding equal-cost path for transmission.

According to the method provided in this embodiment of this application, the switch detects the flowlet after receiving the packet sent by the server, then the switch directly performs flowlet-based load balancing based on the locally stored equal-cost path weight table. The equal-cost path weight table stores the correspondence between the at least one equal-cost path and the weight value. For example, after detecting that the currently received packet is the first packet of the flowlet, the switch directly determines the destination switch based on the destination address of the packet, determines the weight value of the at least one equal-cost path associated with the destination switch in the stored equal-cost path weight table, and further schedules, based on the weight value of the at least one equal-cost path, the packet onto the corresponding equal-cost path for transmission, thereby implementing load balancing without obtaining load statuses of all paths in real time. This greatly reduces complexity of a load balancing algorithm, and achieves a relatively great effect.

In another embodiment, the scheduling, based on the weight value of the at least one equal-cost path, the packet onto a corresponding equal-cost path for transmission includes:

obtaining a weight value of each of the at least one equal-cost path, calculating a sum of weight values of all the equal-cost paths, and generating a random number in a value range from zero to the sum of the weight values, determining, from the at least one equal-cost path based on a value of the random number, a first designated equal-cost path matching the random number, and scheduling the packet onto the first designated equal-cost path for transmission.

In another embodiment, the determining whether the packet is a first packet of the flowlet includes:

performing hash calculation based on 5-tuple information of the packet to obtain a hash value, determining a flowlet entry matching the hash value in a stored flowlet table, and if valid bit information in the flowlet entry is a first value, determining that the packet is the first packet of the flowlet, updating the 5-tuple information and last active time in the flowlet entry, where the last active time is updated as current time, and updating the valid bit information from the first value to a second value.

A flowlet entry includes at least 5-tuple information, last active information, outport information, and valid bit information of a flowlet.

In another embodiment, the method further includes:

if the valid bit information in the flowlet entry is the second value, determining that the packet is a non-first packet of the flowlet, and determining a second designated equal-cost path based on the outport information in the flowlet entry; and scheduling the packet onto the second designated equal-cost path for transmission, and updating the last active time in the flowlet entry as the current time.

In another embodiment, the method further includes:

after determining the first designated equal-cost path matching the random number, storing a path identifier of the first designated equal-cost path as outport information, into a flowlet entry corresponding to the flowlet table.

In another embodiment, the method further includes:

if a link status of the at least one equal-cost path changes, sending a link status change message to a controller, where the link status change message indicates a third designated equal-cost path whose link status changes, so that the controller recalculates the weight value of the at least one equal-cost path based on the link status change message, to obtain a new equal-cost path weight table; and receiving the new equal-cost path weight table sent by the controller, and storing the new equal-cost path weight table.

In another embodiment, the method further includes:

for each flowlet entry in the flowlet table, periodically calculating a difference between current time and last active time; and if the difference is greater than a preset time threshold, setting the flowlet entry to an invalid state.

Any combination of all the foregoing optional technical solutions can form an optional embodiment of this application. Details are not described herein.

Figure 12:
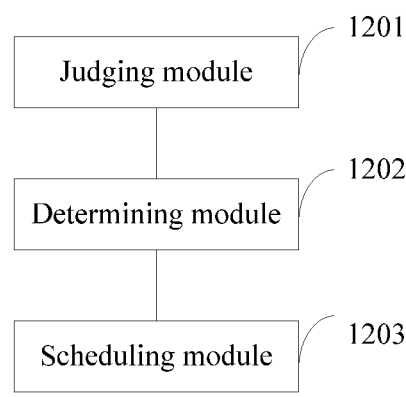
FIG. 12 is a schematic structural diagram of a load balancing apparatus according to an embodiment of this application.

FIG. 12 is a schematic structural diagram of a load balancing apparatus according to an embodiment of this application. Referring to FIG. 12, the apparatus includes a judging module 1201, a determining module 1202, and a scheduling module 1203.

The judging module 1201 is configured to: after a packet sent by a server is received, determine whether the packet is a first packet of a flowlet.

The determining module 1202 is configured to: if the packet is the first packet of the flowlet, determine a destination switch based on a destination address of the packet.

The determining module 1202 is further configured to: determine a weight value of at least one equal-cost path associated with the destination switch in a stored equal-cost path weight table. The equal-cost path weight table stores a correspondence between the at least one equal-cost path and the weight value.

The scheduling module 1203 is configured to schedule, based on the weight value of the at least one equal-cost path, the packet onto a corresponding equal-cost path for transmission.

In another embodiment, the scheduling module 1203 is configured to: obtain a weight value of each of the at least one equal-cost path; calculate a sum of weight values of all the equal-cost paths, and generate a random number in a value range from zero to the sum of the weight values; determine, from the at least one equal-cost path based on a value of the random number, a first designated equal-cost path matching the random number; and schedule the packet onto the first designated equal-cost path for transmission.

In another embodiment, the apparatus further includes:

the judging module 1201, configured to perform hash calculation based on 5-tuple information of the packet to obtain a hash value; determine a flowlet entry matching the hash value in a stored flowlet table; and if valid bit information in the flowlet entry is a first value, determine that the packet is the first packet of the flowlet; and an updating module 1204, configured to: when the packet is the first packet of the flowlet, update the 5-tuple information and last active time in the flowlet entry, where the last active time is updated as current time; and update the valid bit information from the first value to a second value, where a flowlet entry includes at least 5-tuple information, last active information, outport information, and valid bit information of a flowlet.

In another embodiment, the judging module 1201 is further configured to: if the valid bit information in the flowlet entry is the second value, determine that the packet is a non-first packet of the flowlet;

the determining module 1202 is further configured to: when the packet is the non-first packet of the flowlet, determine a second designated equal-cost path based on the outport information in the flowlet entry; and the scheduling module 1203 is further configured to: when the packet is the non-first packet of the flowlet, schedule the packet onto the second designated equal-cost path for transmission;

and the updating module 1204 is further configured to: when the packet is the non-first packet of the flowlet, update the last active time in the flowlet entry as the current time.

In another embodiment, the apparatus further includes:

a storage module 1205, configured to: after the first designated equal-cost path matching the random number is determined, store a path identifier of the first designated equal-cost path as outport information, into a flowlet entry corresponding to the flowlet table.

In another embodiment, the apparatus further includes:

a sending module 1205, configured to: if a link status of the at least one equal-cost path changes, send a link status change message to a controller, where the link status change message indicates a third designated equal-cost path whose link status changes, so that the controller recalculates the weight value of the at least one equal-cost path based on the link status change message, to obtain a new equal-cost path weight table; and a receiving module 1206, configured to receive the new equal-cost path weight table sent by the controller, and store the new equal-cost path weight table.

In another embodiment, the apparatus further includes:

a calculation module 1207, configured to: for each flowlet entry in the flowlet table, periodically calculate a difference between current time and last active time; and a setting module 1208, configured to: if the difference is greater than a preset time threshold, set the flowlet entry to an invalid state.

After the apparatus provided in this embodiment of this application receives and stores the equal-cost path weight table delivered by the controller, if the apparatus receives the packet sent by the server, the apparatus detects the flowlet, and directly performs flowlet-based load balancing based on the locally stored equal-cost path weight table and the locally stored flowlet table, to select an equal-cost path for transmitting the currently received packet. The apparatus needs to recalculate the weight value of the equal-cost path only when a link status changes, instead of obtaining load statuses of all paths in real time. This greatly reduces complexity of a load balancing algorithm, and achieves a relatively great effect.

Figure 13:
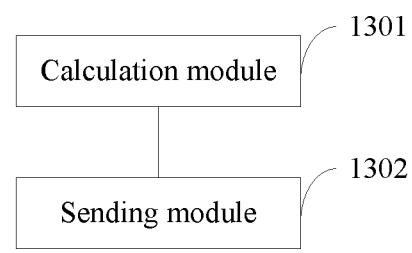
FIG. 13 is a schematic structural diagram of a load balancing apparatus according to an embodiment of this application.

FIG. 13 is a schematic structural diagram of a load balancing apparatus according to an embodiment of this application. Referring to FIG. 13, the apparatus includes a calculation module 1301 and a sending module 1302.

The calculation module 1301 is configured to: for a source switch, calculate weight values of multiple equal-cost paths between the source switch and destination switches, to obtain an equal-cost path weight table of the source switch; and The sending module 1302 is configured to: deliver the equal-cost path weight table to the source switch, so that after receiving a packet sent by a server and determining that the packet is a first packet of a flowlet, the source switch determines a destination switch based on a destination address of the packet, determines a weight value of at least one equal-cost path associated with the destination switch in the equal-cost path weight table, and schedules, based on the weight value of the at least one equal-cost path, the packet onto a corresponding equal-cost path for transmission.

In another embodiment, the calculation module 1301 is configured to: for a destination switch, determine each equal-cost path between the source switch and the destination switch, where the equal-cost path includes a first link path from the source switch to a transit switch, and a second link path from the transit switch to the destination switch; and for an equal-cost path, calculate a weight value of the equal-cost path based on link statuses of the first link path and the second link path.

In another embodiment, the apparatus further includes:
a receiving module 1303, configured to receive a link status change message sent by the source switch, where the link status change message indicates an equal-cost path whose link status changes.

The calculation module 1301 is further configured to: recalculate weight values of multiple equal-cost paths between each source switch and each destination switch based on the link status change message, to obtain a new equal-cost path weight table.

The sending module 1302 is further configured to send the new matched equal-cost path weight table to the source switch.

After the apparatus provided in this embodiment of this application sets a weight value for each equal-cost path between every two switches based on overall network link information, and delivers the corresponding equal-cost path weight table to each switch, if the switch receives a packet sent by a server, the switch detects the flowlet, and directly performs flowlet-based load balancing based on the locally stored equal-cost path weight table and a locally stored flowlet table, to select an equal-cost path for transmitting the currently received packet. The switch needs to recalculate the weight value of the equal-cost path only when a link status changes, instead of obtaining load statuses of all paths in real time. This greatly reduces complexity of a load balancing algorithm, and achieves a relatively great effect.

It should be noted that, when the load balancing apparatus provided in the foregoing embodiment performs load balancing, division of the foregoing function modules is merely used as an example for illustration. In actual application, the foregoing functions may be allocated to and implemented by different function modules as required. In other words, an inner structure of the apparatus is divided into different function modules to implement all or some of the foregoing functions described above. In addition, the load balancing apparatus provided in the foregoing embodiment and the load balancing method belong to a same concept. For a specific implementation process of the load balancing apparatus, refer to the method embodiment. Details are not described herein again.

Persons of ordinary skill in the art may understand that all or some of the operations of the embodiments may be implemented by hardware or a program instructing related hardware. The program may be stored in a computer-readable storage medium. The storage medium may include a read-only memory, a magnetic disk, or an optical disc.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A load balancing method comprising:
after a packet sent by a server is received, determining whether the packet is a first packet of a flowlet;
if the packet is the first packet of the flowlet, determining a destination switch based on a destination address of the packet;
determining a weight value of at least one equal-cost path associated with the destination switch in a stored equal-cost path weight table, wherein the equal-cost path weight table stores a correspondence between the at least one equal-cost path and the weight value; and
scheduling, based on the weight value of the at least one equal-cost path, the packet onto a corresponding equal-cost path for transmission,
wherein the load balancing method is configured to implement load balancing without obtaining load statuses of all paths in real time, and
wherein the scheduling, based on the weight value of the at least one equal-cost path, the packet onto a corresponding equal-cost path for transmission comprises:
obtaining a weight value of each of the at least one equal-cost path;
calculating a sum of weight values of all the equal-cost paths, and generating a random number in a value range from zero to the sum of the weight values;
determining, from the at least one equal-cost path based on a value of the random number, a first designated equal-cost path matching the random number; and
scheduling the packet onto the first designated equal-cost path for transmission.

2. The method according to claim 1, wherein the determining whether the packet is a first packet of a flowlet comprises:
performing hash calculation based on 5-tuple information of the packet to obtain a hash value;
determining a flowlet entry matching the hash value in a stored flowlet table; and
if valid bit information in the flowlet entry is a first value, determining that the packet is the first packet of the flowlet, updating the 5-tuple information and last active time in the flowlet entry, wherein the last active time is updated as current time, and updating the valid bit information from the first value to a second value, wherein
a flowlet entry comprises at least 5-tuple information, last active information, outport information, and valid bit information of a flowlet.

3. The method according to claim 2, further comprising:
if the valid bit information in the flowlet entry is the second value, determining that the packet is a non-first packet of the flowlet, and determining a second designated equal-cost path based on the outport information in the flowlet entry; and scheduling the packet onto the second designated equal-cost path for transmission, and updating the last active time in the flowlet entry as the current time.

4. The method according to of claim 2, further comprising:

for each flowlet entry in the flowlet table, periodically calculating a difference between current time and last active time; and if the difference is greater than a preset time threshold, setting the flowlet entry to an invalid state.

5. The method according to claim 1, further comprising:

after determining the first designated equal-cost path matching the random number, storing a path identifier of the first designated equal-cost path as outport information, into a flowlet entry corresponding to the flowlet table.

6. The method according to claim 1, further comprising:

if a link status of the at least one equal-cost path changes, sending a link status change message to a controller, wherein the link status change message indicates a third designated equal-cost path whose link status changes, so that the controller recalculates the weight value of the at least one equal-cost path based on the link status change message, to obtain a new equal-cost path weight table; and receiving the new equal-cost path weight table sent by the controller, and storing the new equal-cost path weight table.

7. A load balancing apparatus comprising: a memory and a processor, wherein the memory stores program code, and the processor is configured to invoke the program code to perform the following operations:

after a packet sent by a server is received, determining whether the packet is a first packet of a flowlet;

if the packet is the first packet of the flowlet, determining a destination switch based on a destination address of the packet;

determining a weight value of at least one equal-cost path associated with the destination switch in a stored equal-cost path weight table, wherein the equal-cost path weight table stores a correspondence between the at least one equal-cost path and the weight value;

scheduling, based on the weight value of the at least one equal-cost path, the packet onto a corresponding equal-cost path for transmission;

obtaining a weight value of each of the at least one equal-cost path;

calculating a sum of weight values of all the equal-cost paths;

generating a random number in a value range from zero to the sum of the weight values;

determining, from the at least one equal-cost path based on a value of the random number, a first designated equal-cost path matching the random number; and scheduling the packet onto the first designated equal-cost path for transmission.

8. The apparatus according to claim 7, wherein the processor is further configured to invoke the program code to perform the following operations:

performing hash calculation based on 5-tuple information of the packet to obtain a hash value;

determining a flowlet entry matching the hash value in a stored flowlet table;

determining that the packet is the first packet of the flowlet, if valid bit information in the flowlet entry is a first value;

when the packet is the first packet of the flowlet, updating the 5-tuple information and last active time in the flowlet entry, wherein the last active time is updated as current time; and updating the valid bit information from the first value to a second value, wherein a flowlet entry comprises at least 5-tuple information, last active information, outport information, and valid bit information of a flowlet.

9. The apparatus according to claim 8, wherein the processor is further configured to invoke the program code to perform the following operations: if the valid bit information in the flowlet entry is the second value, determining that the packet is a non-first packet of the flowlet;

when the packet is the non-first packet of the flowlet, determining a second designated equal-cost path based on the outport information in the flowlet entry;

when the packet is the non-first packet of the flowlet, scheduling the packet onto the second designated equal-cost path for transmission; and when the packet is the non-first packet of the flowlet, updating the last active time in the flowlet entry as the current time.

10. The apparatus according to claim 8, wherein the processor is further configured to invoke the program code to perform the following operations:

for each flowlet entry in the flowlet table, periodically calculating a difference between current time and last active time; and if the difference is greater than a preset time threshold, setting the flowlet entry to an invalid state.

11. The apparatus according to claim 7, wherein the processor is further configured to invoke the program code to perform the following operations:

after the first designated equal-cost path matching the random number is determined, storing a path identifier of the first designated equal-cost path as outport information, into a flowlet entry corresponding to the flowlet table.

12. The apparatus according to claim 7, further comprising: a transmitter and a receiver;

the transmitter is configured to if a link status of the at least one equal-cost path changes, send a link status change message to a controller, wherein the link status change message indicates a designated equal-cost path whose link status changes, so that the controller recalculates the weight value of the at least one equal-cost path based on the link status change message, to obtain a new equal-cost path weight table; and the receiver is configured to receive the new equal-cost path weight table sent by the controller, and store the new equal-cost path weight table.

13. A load balancing apparatus comprising: a transmitter, a receiver, a memory, and a processor, wherein the memory, the transmitter, and the receiver are all connected to the processor, the memory stores program code, and the processor is configured to invoke the program code to perform the following operations:

for a source switch, calculating weight values of multiple equal-cost paths between the source switch and destination switches, to obtain an equal-cost path weight table of the source switch;

the transmitter is configured to deliver the equal-cost path weight table to the source switch, so that after receiving a packet sent by a server and determining that the packet is a first packet of a flowlet, the source switch to determine a destination switch based on a destination address of the packet, determine a weight value of at least one equal-cost path associated with the destination switch in the equal-cost path weight table, schedule, based on the weight value of the at least one equal-cost path, the packet onto a corresponding equal-cost path for transmission, obtain a weight value of each of the at least one equal-cost path, calculate a sum of weight values of all the equal-cost paths, generate a random number in a value range from zero to the sum of the weight values, determine, from the at least one equal-cost path based on a value of the random number, a first designated equal-cost path matching the random number, and schedule the packet onto the first designated equal-cost path for transmission.

14. The apparatus according to claim 13, wherein the processor is further configured to invoke the program code to perform the following operations:

for a destination switch, determining each equal-cost path between the source switch and the destination switch, wherein the equal-cost path comprises a first link path from the source switch to a transit switch, and a second link path from the transit switch to the destination switch;

and for an equal-cost path, calculating a weight value of the equal-cost path based on link statuses of the first link path and the second link path.

15. The apparatus according to claim 13, wherein the receiver is configured to receive a link status change message sent by the source switch, wherein the link status change message indicates an equal-cost path whose link status changes, wherein the processor is further configured to invoke the program code to perform the following operations: recalculating weight values of multiple equal-cost paths between each source switch and each destination switch based on the link status change message, to obtain a new equal-cost path weight table; and the transmitter is further configured to send the new matched equal-cost path weight table to the source switch.

* * * * *